United States Patent
Calhoun et al.

(10) Patent No.: US 10,009,833 B2
(45) Date of Patent: Jun. 26, 2018

(54) MANAGED ACCESS POINT PROTOCOL

(71) Applicant: Cisco Technology, Inc., San Jose, CA (US)

(72) Inventors: Patrice R. Calhoun, Pleasanton, CA (US); Scott G. Kelly, Fremont, CA (US); Rohit Kumar Suri, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 98 days.

(21) Appl. No.: 14/872,222

(22) Filed: Oct. 1, 2015

(65) Prior Publication Data

US 2016/0029301 A1 Jan. 28, 2016

Related U.S. Application Data (60) Division of application No. 13/919,872, filed on Jun. 17, 2013, now Pat. No. 9,179,398, which is a
(Continued)

(51) Int. Cl.
*H04W 48/16* (2009.01)
*H04L 29/06* (2006.01)
(Continued)

(52) U.S. Cl.
CPC ......... *H04W 48/16* (2013.01); *H04L 63/0823* (2013.01); *H04W 12/06* (2013.01);
(Continued)

(58) Field of Classification Search
CPC ..... H04W 48/16; H04W 12/04; H04W 12/06; H04W 24/02; H04W 40/246;
(Continued)

(56) References Cited

U.S. PATENT DOCUMENTS 5,491,692 A   2/1996  Gunner et al.
5,684,860 A  11/1997  Milani et al.
(Continued)

FOREIGN PATENT DOCUMENTS

WO      01/52084 A1    7/2001

OTHER PUBLICATIONS

International Standard, ISO/IEC 8802-11 ANSI/IEEE Std. 802.11, 1999 Edition, Part II: Wireless LAN Medium Access Control (MAC) and Physical Layer (PHY) specifications, pp. 122-137.
(Continued)

*Primary Examiner* — Obaidul Huq
(74) *Attorney, Agent, or Firm* — Edell, Shapiro & Finnan, LLC (57) ABSTRACT

Methods, apparatuses and systems facilitating deployment and configuration of managed access points in hierarchical wireless network systems. An embodiment of the invention facilitates deployment and configuration of conventional, substantially autonomous access points operating in connection with a central management node, such as a server or appliance. In another embodiment, the present invention facilitates deployment and configuration of light-weight access points in a hierarchical wireless network system. In one embodiment, the present invention also provides a streamlined encryption key exchange protocol adapted to hierarchical wireless network system architectures.

20 Claims, 4 Drawing Sheets

Related U.S. Application Data continuation of application No. 13/441,645, filed on Apr. 6, 2012, now Pat. No. 8,467,362, which is a continuation of application No. 12/388,171, filed on Feb. 18, 2009, now Pat. No. 8,169,987, which is a continuation of application No. 10/394,905, filed on Mar. 21, 2003, now Pat. No. 7,508,801.

(51) Int. Cl.
| | | |
|---|---|---|
| *H04W 12/06* | (2009.01) | |
| *H04W 24/02* | (2009.01) | |
| *H04W 40/24* | (2009.01) | |
| *H04W 8/00* | (2009.01) | |
| *H04W 12/04* | (2009.01) | |
| *H04W 84/12* | (2009.01) | |
| *H04W 12/02* | (2009.01) | |

(52) U.S. Cl.
CPC ......... *H04W 24/02* (2013.01); *H04W 40/246* (2013.01); *H04L 63/062* (2013.01); *H04W 8/005* (2013.01); *H04W 12/02* (2013.01); *H04W 12/04* (2013.01); *H04W 84/12* (2013.01)

(58) Field of Classification Search
CPC ..... H04W 8/005; H04W 84/12; H04W 12/02; H04L 63/062; H04L 63/0823
USPC ........................................ 370/310, 328, 338
See application file for complete search history.

(56) References Cited

U.S. PATENT DOCUMENTS

| | | | |
|---|---|---|---|
| 6,026,297 A * | 2/2000 | Haartsen | H04W 84/18 455/414.1 |
| 6,208,629 B1 | 3/2001 | Jaszewski et al. | |
| 6,286,038 B1 | 9/2001 | Reichmeyer et al. | |
| 6,760,318 B1 | 7/2004 | Bims | |
| 6,788,658 B1 | 9/2004 | Bims | |
| 6,876,850 B2 | 4/2005 | Maeshima et al. | |
| 6,917,819 B2 | 7/2005 | Collins | |
| 6,925,070 B2 | 8/2005 | Proctor, Jr. | |
| 7,508,801 B1 | 3/2009 | Calhoun et al. | |
| 7,532,862 B2 * | 5/2009 | Cheshire | G06Q 30/0267 380/270 |
| 8,169,987 B2 | 5/2012 | Calhoun et al. | |
| 8,467,362 B2 | 6/2013 | Calhoun et al. | |
| 2002/0006130 A1 | 1/2002 | Tai et al. | |
| 2002/0110105 A1 | 8/2002 | Awater et al. | |
| 2002/0188723 A1 | 12/2002 | Choi et al. | |
| 2002/0194384 A1 | 12/2002 | Habetha | |
| 2003/0023746 A1 | 1/2003 | Loguinov | |
| 2003/0188006 A1 | 10/2003 | Bard | |
| 2003/0198208 A1 | 10/2003 | Koos, Jr. et al. | |
| 2003/0224787 A1 | 12/2003 | Gandolfo | |
| 2004/0068668 A1 * | 4/2004 | Lor | H04L 63/107 726/15 |
| 2004/0090942 A1 * | 5/2004 | Flinck | H04W 8/04 370/338 |
| 2004/0111607 A1 | 6/2004 | Yellepeddy | |
| 2004/0136318 A1 | 7/2004 | Bentley | |
| 2013/0343367 A1 | 12/2013 | Calhoun et al. | |

OTHER PUBLICATIONS

"tcp-masq" Internet citation http://speed.cls.nctu.edu.tw/bandwith/opensource/, Daa Sheet Cisco Alronet 1200 Series Access Point, pp. 1-13, posted Mar. 11, 2002.
Calhoun et al., U.S. Appl. No. 10/394,905, Non-final Office Action.
Calhoun et al., U.S. Appl. No. 10/394,905, Response to non-final Office Action.
Calhoun et al., U.S. Appl. No. 10/394,905, Response to Non-final Office Action M Calhoun eta!., USSN.
Calhoun et al., U.S. Appl. No. 10/394,905, Notice of Allowance.
Calhoun et al., U.S. Appl. No. 12/388,171, Non-final Office Action.
Calhoun et al., U.S. Appl. No. 12/388,171, Response to Non-final Office Action.
Calhoun et al., U.S. Appl. No. 12/388,171, Notice of Allowance.
Calhoun et al., U.S. Appl. No. 13/441,645, Preliminary Amendment.
Calhoun et al., U.S. Appl. No. 13/441,645, Non-final Office Action.
Calhoun et al., U.S. Appl. No. 13/441,645, Response to Non-final Office Action.
Calhoun et al., U.S. Appl. No. 13/441,645, Notice of Allowance.

* cited by examiner

MANAGED ACCESS POINT PROTOCOL

CROSS-REFERENCE TO RELATED APPLICATIONS

This application is a divisional of U.S. application Ser. No. 13/919,872, filed Jun. 17, 2013, which is a continuation of U.S. application Ser. No. 13/441,645, filed on Apr. 6, 2012, now U.S. Pat. No. 8,467,362, which is a continuation of U.S. application Ser. No. 12/388,171, filed on Feb. 18, 2009, now U.S. Pat. No. 8,169,987, which is a continuation of U.S. application Ser. No. 10/394,905 filed Mar. 21, 2003, now U.S. Pat. No. 7,508,801," which are incorporated herein by reference in their entirety for all purposes.

This application makes reference to the following commonly owned U.S. patent applications and/or patents, which are incorporated herein by reference in their entirety for all purposes:

U.S. patent application Ser. No. 10/155,938 in the name of Patrice R. Calhoun, Robert B. O'Hara, Jr. and Robert J. Friday, entitled "Method and System for Hierarchical Processing of Protocol Information in a Wireless LAN," now U.S. Pat. No. 7,340,247.

FIELD OF THE INVENTION

The present invention relates to wireless networks and, more particularly, to methods, apparatuses and systems facilitating the deployment and configuration of managed access points in a hierarchical wireless network system.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but the changing role WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

As enterprises and other entities increasingly rely on wireless networks, monitoring and management of the components implementing the wireless network environments become critical to performance and security. Heretofore, it has not been recognized how important visibility into all layers of the network protocol is to optimization of network manageability and user performance in wireless LANs (WLANs). Unlike centrally-managed cellular wireless systems, known WLAN solutions use distributed access points to act as bridges between the wired infrastructure and the wireless clients, removing all physical and wireless media access protocol information from the protocol frames that are passed onto the infrastructure network. This results in uncoordinated handoffs of wireless clients moving between access points. An uncoordinated system of access points makes it difficult to manage a large number of access points, because there is no point of coordination. For example, known prior art wireless network systems such as conventional 802.11 systems provide the initial handshaking, access authentication and access association at a remote node without attention to overall network loading and signal quality.

This type of distributed architecture creates many problems affecting network management, mobility, and performance. Since each wireless LAN access point is a separate managed device, distributed architecture in general introduces many new managed elements in the network without sufficient attention to their global effects. Since the access points act in their own self-interest and are not aware of the actions taken by surrounding access points, they handle mobility (e.g., handoff actions) as a local event, which significantly increases latency.

U.S. application Ser. No. 10/155,938, identified above, discloses a hierarchical wireless network architecture that optimizes network management and performance of a relatively autonomously-managed WLAN. According to the system architecture, a central control element manages and controls one more access elements. These light-weight access elements perform real-time communication functions, such as data transfer and acknowledgements, while the central control element manages the connection between the access element and one or more wireless client devices.

Configuration of wireless network systems incorporating many managed access points can be complicated and time consuming. For example, configuration of the access elements in the hierarchical wireless network architecture disclosed above can be complicated and/or time consuming, especially where large number of access elements are deployed. Accordingly, a need in the art exists for methods, apparatuses and systems that facilitate the deployment and configuration of managed access elements in a hierarchical wireless network system.

Embodiments of the present invention substantially fulfill this need.

SUMMARY OF THE INVENTION

The present invention provides methods, apparatuses and systems facilitating deployment and configuration of managed access points in hierarchical wireless network systems. An embodiment of the invention facilitates deployment and configuration of conventional, substantially autonomous access points operating in connection with a central management node, such as a server or appliance. In another embodiment, the present invention facilitates deployment and configuration of light-weight access points in a hierarchical wireless network system. In one embodiment, the present invention also provides a streamlined encryption key exchange protocol adapted to hierarchical wireless network system architectures.

DESCRIPTION OF PREFERRED EMBODIMENT(S)

A. Operating Environment and Exemplary System Architectures

For didactic purposes, an embodiment of the present invention is described as operating in a WLAN environment as disclosed in U.S. application Ser. No. 10/155,938 incorporated by reference herein. As discussed below, however, the present invention can be implemented in a variety of WLAN system architectures.

Figure 1:
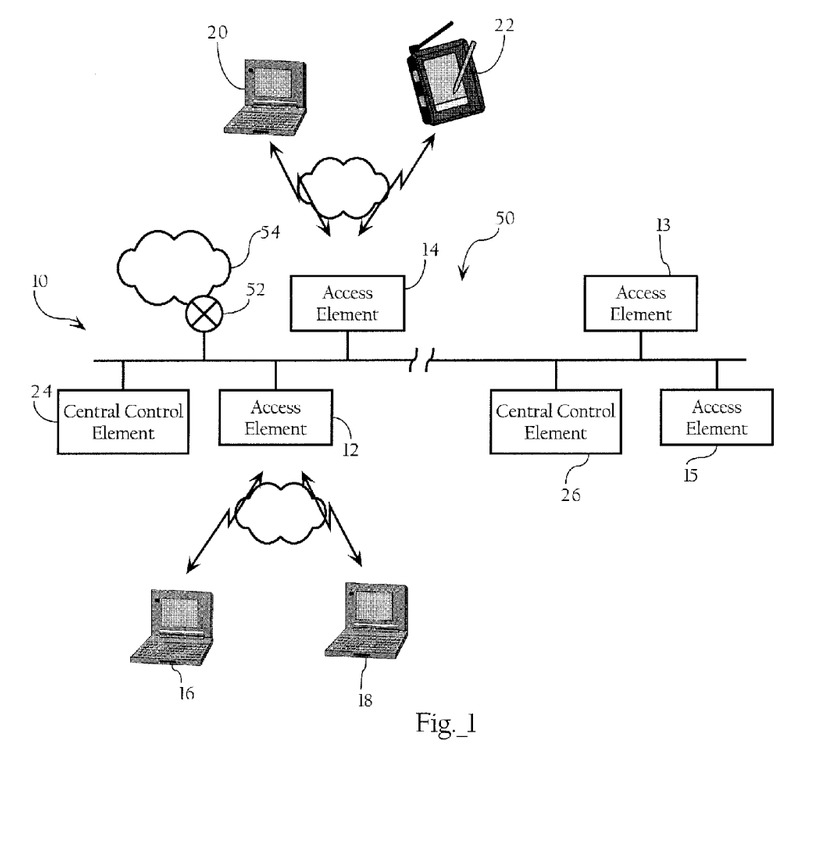
FIG. 1 is a functional block diagram illustrating a wireless network system according to an embodiment of the present invention.

FIG. 1 illustrates a wireless computer network environment according to an embodiment of the present invention. Referring to FIG. 1, there is shown block diagram of a wireless Local Area Network (LAN) 10 according to an embodiment of the invention. A specific embodiment of the invention includes the following elements: access elements 12-15 for wireless communication with remote client elements 16, 18, 20, 22 and central control elements 24, 26 for controlling and managing the wireless connections between the access elements 12-15 and the remote client elements. In one embodiment, access elements 12, 14 are directly connected to LAN 10 or a virtual local area network (VLAN) for communication with central control element 24, while access elements 13, 15 are connected to a second LAN segment for communication with central control element 26. In one embodiment, central control elements 24, 26 and access elements 12-15 are all connected to the same VLAN to allow for layer 2 and layer 3 discovery mechanisms as described more fully below.

The access elements 12-15 are coupled via communication means using a wireless local area network (WLAN) protocol (e.g., IEEE 802.11a or 802.11b, etc.) to the client remote elements 16, 18, 20, 22. The LAN segment 10 connecting the access elements 12, 14 and the central control element 24 is typically an Ethernet network, but it could be anything else which is appropriate to the environment. In one embodiment, the access elements 12, 14 and the central control element 24 tunnel network traffic associated with corresponding remote client elements 16, 18; 20, 22 over the computer network. Central control element 24 is also operative to bridge the network traffic between the remote client elements 16, 18; 20, 22 transmitted through the tunnel with corresponding access elements 12, 14. Accordingly, remote client elements 16, 18; 20, 22 may, for example, access resources available on WAN 50 or on global network 54 via router 52.

As described in the above-identified patent application, central control element 24 operates to perform link layer management functions, such as authentication and association on behalf of access elements 12, 14. For example, the central control element 24 provides processing to dynamically configure a wireless Local Area Network of a system according to the invention while the access elements 12, 14 provide the acknowledgment of communications with the client remote elements 16, 18, 20, 22. The central control element 24 may for example process the wireless LAN management messages passed on from the client remote elements 16, 18; 20, 22 via the access elements 12, 14, such as authentication requests and authorization requests, whereas the access elements 12, 14 provide immediate acknowledgment of the communication of those messages without conventional processing thereof. Similarly, the central control element 24 may for example process physical layer information. Still further, the central control element 24 may for example process information collected at the access elements 12, 14 on channel characteristic, propagation, and interference or noise. Central control element 24 may also transmit control messages to the access elements 12, 14 to change various operational parameters, such as frequency channel and transmit power. Central control element 26 and associated access elements 13, 15 operate in a similar or identical manner.

Figure 2:
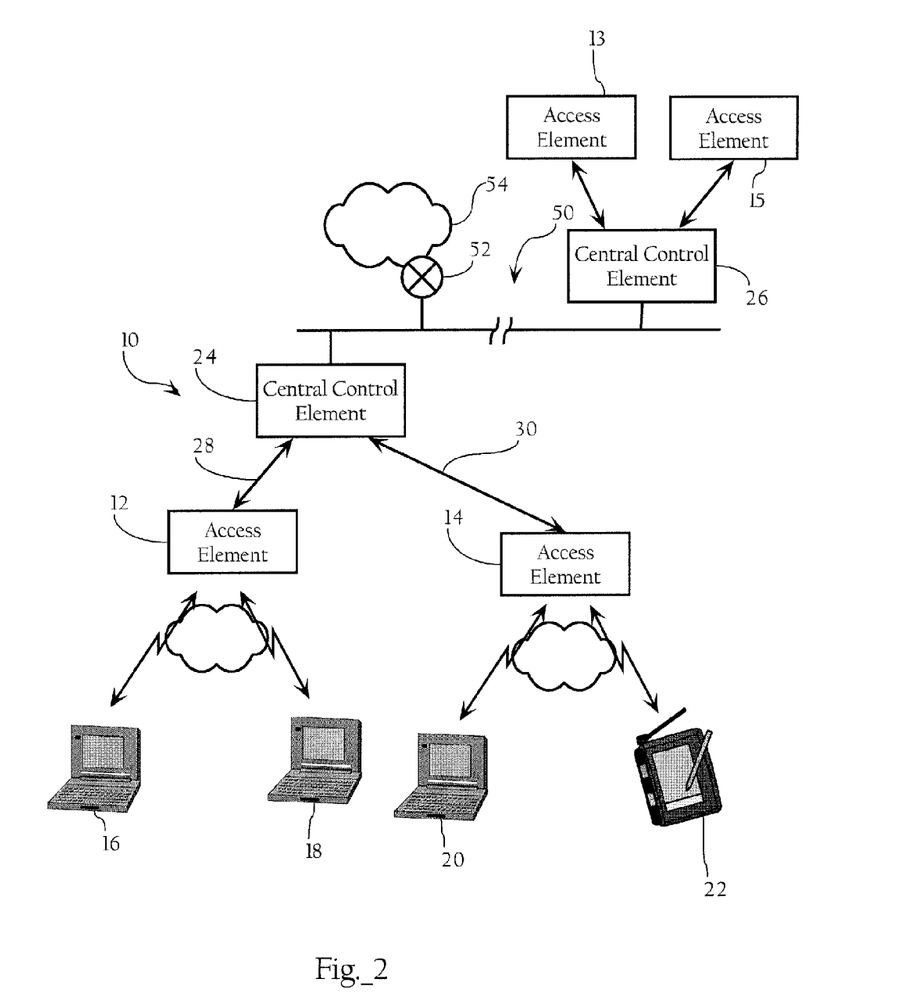
FIG. 2 is a functional block diagram illustrating a wireless network system architecture according to a second embodiment of the present invention.

As FIG. 1 illustrates, according to another embodiment, central control element 24 can communicate with access elements 12, 14 over local area network segment 10. In addition, using a virtual local area network (VLAN) technology and protocols, central control element 24 may also communicate with access element 15 over WAN 50. Suitable VLAN protocols include the IEEE 802.1Q (VLAN tagging) protocol or any other protocol allowing for a logical or virtual link layer connection between the central control element and the access elements. According to this deployment architecture, wireless traffic associated with remote client elements 16, 18; 20, 22, according to one embodiment, can be tunneled between the central control element 24 and the access elements 12, 14. In another embodiment, access elements 12, 14 can operate to directly bridge network traffic between remote client elements 16, 18; 20, 22 and WAN 50, while tunneling network management messages, such as authentication and association requests from remote client elements to central control element 24 as discussed above. In addition, according to either embodiment, access elements 12, 14, central control element 24, or both access elements 12, 14 and central control element 24 can include layer 2 or layer 3 discovery mechanisms allowing for automatic discovery and configuration across WAN 50 of the components (central control elements and access elements) effecting the wireless network environment. Furthermore, FIG. 2 illustrates an alternative deployment architecture where the access elements 12-15 are connected to their respective central control elements 24, 26 via direct access lines 28, 30.

B. Light-Weight Access Point Protocol (LWAPP)

The light-weight access point protocol includes functionality directed to initialization and configuration of access elements, as well as failover support. At start-up, the light-weight access point protocol, according to an embodiment of the present invention, includes three main phases: discovery, joinder, and configuration. During the discovery phase, the access element discovers the central control elements to which it can associate. During the joinder phase, the access element and a selected central control element authenticate one another and establish cryptographic keys for use in encrypting subsequent communications. Lastly, the configuration phase involves the configuration of the access element with, for example, operational parameters and, potentially, new software images. The access elements and the central control elements can communicate using a variety of protocols, such as IEEE 802.3, IEEE 802.2, IP, UDP, TCP, etc.

In one embodiment, beyond the functionality discussed above, the central control elements include an image of the access element software accessible to the access elements as discussed more fully below. In addition, the access elements each include a configuration module operative to perform the initialization and configuration functionality described herein. The central control elements and the access elements further include symmetric and asymmetric encryption functionality to perform tasks such as validating digital signatures, and encrypting messages. In addition, the central control elements, in one embodiment, includes a cryptographic key generator for generating cryptographic keys.

In one embodiment, authentications between central control elements and access elements are provided by x.509 digital certificates and RSA digital signatures. Privacy is provided to the key exchange via RSA encryption. The symmetric cryptographic keys, discussed herein, are generated (in one embodiment) using a random number generator which comprises both hardware and software components. Symmetric encryption is provided by using the AES encryption algorithm in counter mode (AES-CTR). Integrity protection (also known as data authentication) is provided using AES-CBC-MAC. A composition of these two algorithms is known as AES CCM (Counter with CBC MAC). However, a variety of encryption algorithms can be used. For example, DSA signatures can be used as an alternative to RSA digital signatures. El-Gamal encryption can be used as an alternative to RSA encryption. Alternatives to AES-CCM encryption include the combination of AES-CBC and HMAC-SHA 1, as well as 3DES-CBC and HMAC-SHA I.

Figure 3A:
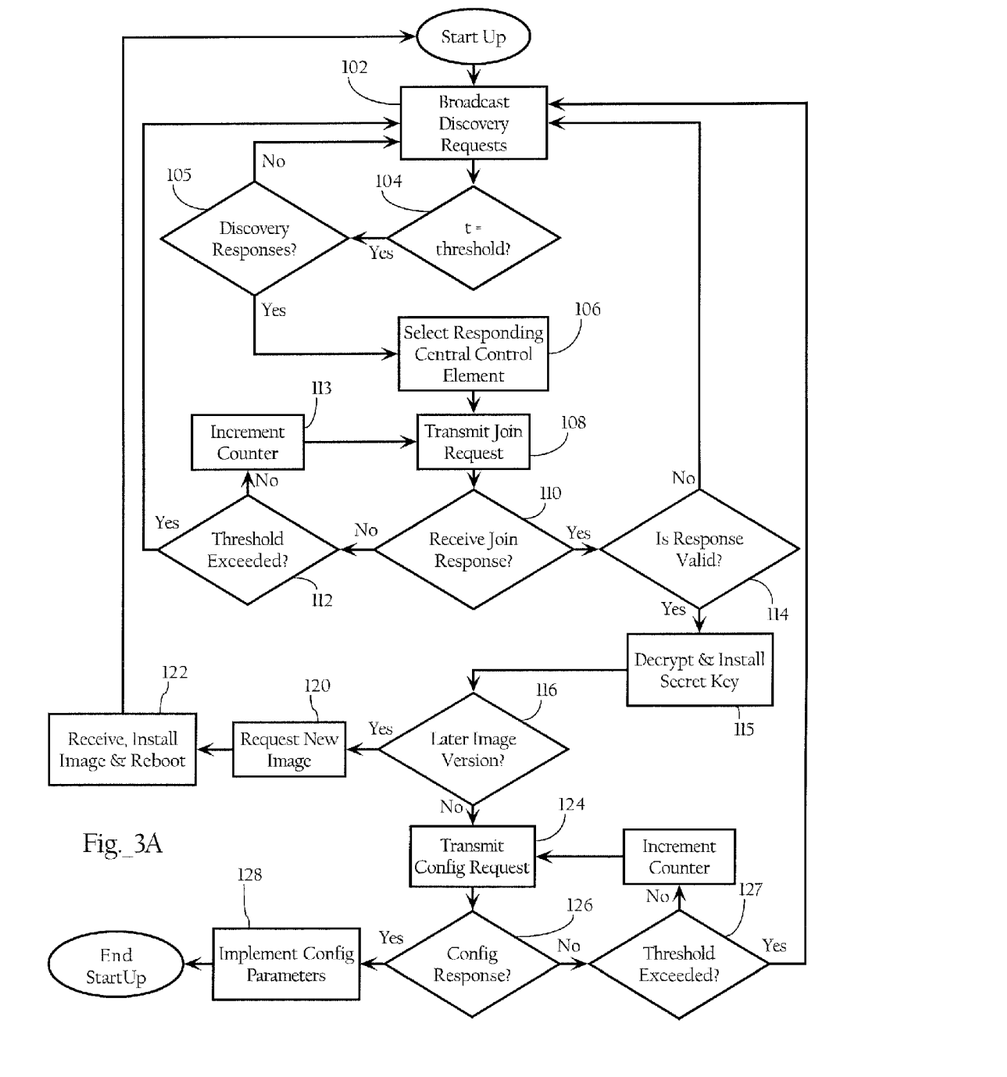
FIG. 3A is a flow chart diagram providing a method directed to the initialization and configuration of an access element.
Figure 4:
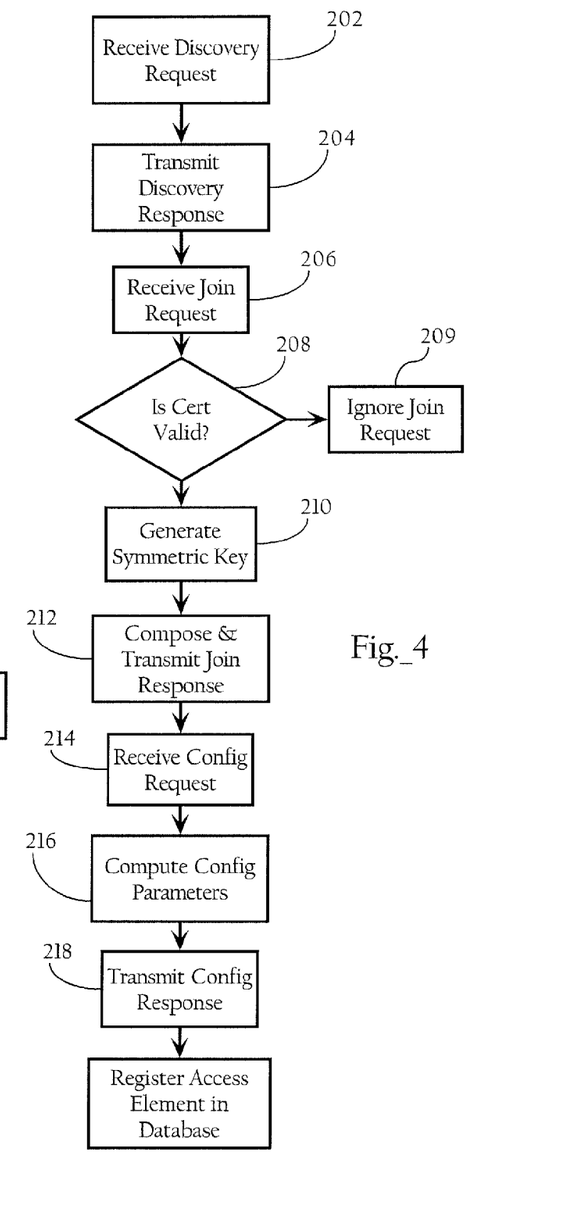
FIG. 4 is a flow chart diagram illustrating a method supporting the initialization and configuration of access elements.

For didactic purposes, assume that a network administrator physically connects access element 15 to WAN 50, which implements a VLAN to which all access elements 12-15 and central control elements 24, 26 are connected. FIG. 3A sets forth a method, according to an embodiment of the present invention, implementing the discovery, joinder and configuration phases of LWAPP. FIG. 4 provides a method, implemented by central control elements, supporting the LWAPP functionality described herein.

At startup, access element 15 broadcasts or multicasts discovery requests throughout the virtual subnet implemented by the VLAN in an attempt to identify central control elements (102). The discovery request may be a single IP packet or native link layer frame, such as an Ethernet frame. As FIG. 3A illustrates, access element 15 waits a threshold period of time for the receipt of discovery responses (104, 105) before broadcasting or multicasting additional discovery requests.

As FIG. 4 illustrates, central control elements 24, 26 receive the discovery requests (202) and transmit discovery responses to access element 15 (204). Each discovery response comprises a central control element identifier and a load parameter. The central control element identifier, in one embodiment, is an arbitrary identifier assigned by a network administrator. The load parameter indicates the performance load associated with the central control element. For example, the load parameter, in one embodiment, is the number of access elements under the management and control of a given central control element. In one embodiment, the discovery response also indicates whether the responding central control element is the "master" central control element. A master central control element is a central control element exclusively tasked with the configuration of access elements. In a large network deployment, centralization of the configuration functionality at a master central control element eases management tasks associated with deploying the wireless network system. For didactic purposes, assume that a network administrator has configured central control element 24 as the master central control element. The master control element indication may be embedded in the central control element identifier or may be contained in a separate, reserved field or bit of the discovery response.

As FIG. 3A illustrates, access element 15 waits a threshold period of time (104, 105) for discovery responses from one or more central control elements and selects one of the responding central control elements identified in the discovery responses (106). The selection of a given central control element can be driven by a number of different considerations. In embodiments involving a master central control element, for example, access element 15 selects the master central control element. In other embodiments, access element 15 selects the responding central control element that reports the smallest load (e.g., the smallest number of access elements under management). In one embodiment, selection of responding central control elements follows the following priority: 1) the primary central control element (if configured), 2) the master central control element, and 3) the central control element reporting the smallest load.

After selection of a central control element, access element 15 transmits a join request to the selected central control element (here, master central control element 24 for purposes of illustration). The join request, in one embodiment, includes an access element identifier, a digital certificate and a session identifier. In one embodiment, the join request includes other fields, such as the WLAN MAC address, software image version, etc. In one embodiment, access element 15 is configured with a default access element identifier, which a network administrator can change as appropriate (e.g., "SW Conference Room AP," etc.). In one embodiment, a network administrator, knowing the LAN MAC address of access element 15 can access a configuration interface to configure a name or other identifier for access element 15 and then invoke the initialization and configuration processes described herein. The digital certificate includes a name or other identifier, a serial number, the LAN and/or WLAN MAC address associated with access element 15, a copy of the public key of the access element (used for encrypting messages and digital signatures), and the digital signature of the certificate-issuing authority (in one embodiment, the manufacturer of the access element) so that central control elements can verify that the digital certificate is authentic. As FIG. 3A illustrates, access element 15 waits for a predetermined period of time for a join response (110). If no join response is received within this period of time, access element 15 retransmits the join request (112, 113). After a threshold number of failed attempts, access element 15, in one embodiment, restarts the discovery process to locate other central control elements. In another embodiment, access element 15 attempts to join with another central control element identified during the previous discovery process.

Central control element 24 (in this example) receives the join request (206) and authenticates the digital certificate in the join request (208). In one embodiment, central control element 24, using the public key of the certificate-issuing authority, validates the digital certificate. If the digital certificate is invalid, central control element 24 ignores the join request (209). Optionally, central control element 24 can issue a notification to a network administrator. Otherwise, central control element 24 generates a secret, shared cryptographic keys (in one embodiment, an authentication key and an encryption key) that will be used to encrypt and authenticate messages between it and access element 15 (210). Central control element 24 then composes a join response and transmits it to access element 15 (212).

The join response, in one embodiment, includes the cryptographic keys (see below), the digital certificate of the central control element, and, optionally, the software image version supported and implemented by central control element 24. Similar to the access element, the digital certificate associated with the central control element includes a name or other identifier, a serial number, a MAC address, a copy of the public key of the central control element, and the digital signature of the certificate-issuing authority (in one embodiment, the manufacturer of the access element) so that access elements can verify that the digital certificate is authentic. To securely transmit and allow for verification of the symmetric cryptographic keys, central control element 24 encrypts the cryptographic keys with the public key of access element 15 using an asymmetric encryption algorithm, adds the session identifier to the enciphered cryptographic keys, and digitally signs the resulting string with its private key.

Figure 3B:
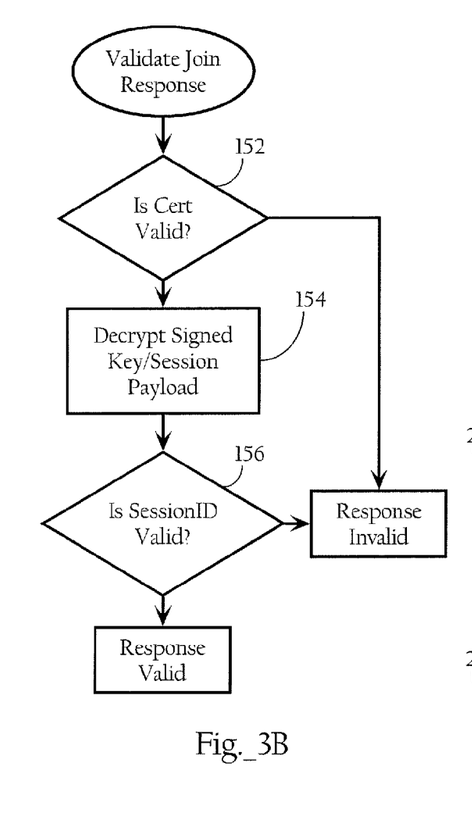
FIG. 3B is a flow chart diagram setting forth a method directed to the validation of a join response transmitted by a central control element.

When access element 15 receives the join response, it validates the join response (114) and, assuming the join response is valid, decrypts and installs the symmetric cryptographic keys (115). FIG. 3B shows a method, according to one embodiment of the present invention, for validating a join response. Access element 15 validates the digital certificate associated with central control element 24 (152). If the digital certificate is valid, access element 15 then verifies the signature of the signed key/sessionID payload using the public key of the central control element 24 (154) and validates the session identifier (156). Access element 15 then decrypts the cipher including the cryptographic keys using its private key (115). Transmission of data (e.g., configuration data, control messages, management messages, etc.) between the access element 15 and central control element 24 can now be encrypted and authenticated using the shared secret cryptographic keys. In one embodiment, the central control elements can generate new cryptographic keys and provide them to the access elements at periodic intervals (e.g., every hour).

In one embodiment, the join request transmitted during the joinder phase can also be configured to determine the Maximum Transmit Unit (MTU) for the link between access element 15 and central control element 24. For example, in one embodiment employing Ethernet protocols, access element 15 transmits a join request spanning 1596 bytes to determine whether the link layer supports that frame size. This frame size is chosen to determine whether a wireless packet (typically the size of a standard Ethernet frame) can be encapsulated with additional headers and transmitted without requiring fragmentation of the native frame. Of course, the size of the initial join request is determined by the format and size of the encapsulating headers. If access element 15 does not receive a response to the join request, it reduces the size of the join request to 1500 bytes (standard Ethernet) and transmits it again. If no response is received after a threshold period of time, access element 15 returns to the discovery phase.

As FIG. 3A illustrates, access element 15 begins the configuration phase, in one embodiment, by comparing the image version identifier in the join response to the image version installed on access element 15 (116). If the image version in the join response is later than the image version associated with access element 15, access element requests the new image version from central control element 24 (120). Access element 15 receives the new image version, installs it and reboots (122), thereby restarting the initialization process described herein. In one embodiment, the image request and response are encrypted using the shared symmetric key exchanged during the joinder phase.

Access element 15, assuming it has a current image version (at least relative to central control element 24), composes and transmits a configuration request to central control element 24 (124). As FIG. 3A provides, access element 15, in one embodiment, retries the configuration request a threshold number of times, after which it returns to the discovery phase (126, 127). The configuration request, in one embodiment, includes a set of overriding configuration parameters that cannot be changed. As discussed above, in one embodiment, the access elements include a configuration interface (e.g., a command line interface, browser interface, etc.) that allows a network administrator to directly configure an access element. In one embodiment, the configuration interface allows a network administrator to configure one or more operational parameters (such as channel, transmit power, internal v. external antenna, etc.) and flag certain operational parameters as overriding parameters which a central control element can not change, except with a new "overriding" parameter value. In another embodiment, access element 15 can be configured only through an interface presented by a central control element.

As FIG. 4 illustrates, central control element 24 receives the configuration request (214), and generates the operational parameters for access element 15 (216), taking into account the overriding parameters identified in the configuration request. Central control element 24 then transmits a configuration response including the operational parameters (218), and registers the access element 15 in a database (e.g., a single table, or a relational database), including identifying information (e.g., LAN MAC address, WLAN MAC address, access element identifier, etc.) and the operational parameters associated with the access element (220). Access element 15 receives the configuration response (126), optionally stores the operational parameters in non-volatile memory, implements the operational parameters (128), and switches to an access point mode. In one embodiment, access element 15 switches to access point mode, using the configuration information provided by the central control element, and transmits a message indicating the start up event to the central control element.

During subsequent start-ups (such as after power cycling, or a forced reboot), access element 15, now configured with the central control element identifier (or link and/or network layer addresses) corresponding to its primary central control element, associates with that central control element as the primary central control element. After the initial configuration, a network administrator may then access a configuration interface associated with central control element 24 and further configure access element 15. For example, the network administrator may specify overriding parameters, or assign a new access element identifier. In addition, the network administrator may configure the access element to associate with an alternative, primary central control element, such as central control element 26. In one embodiment, the physical deployment of the access elements 12-15 may be such that access elements 12, 14 are deployed on a first floor of a building, while access elements 13, 15 are deployed on a second floor or in a separate physical location. The network administrator may then configure access element 15 to associate with central control element 26 to facilitate management and operation of the wireless network, such as handoffs of remote client elements between access element 13 and access element 15.

The access elements, in one embodiment, during normal access point mode operation transmit "keep-alive" messages to their respective primary central control elements to detect failure events associated with the central control elements. Specifically, an access element that does not receive a response to a keep-alive message after a threshold period of time and/or after a threshold number of attempts, assumes that its primary central control element has failed. During a failover mode, the affected access elements repeat the discovery, joinder and configuration phases discussed above.

During this failover period, the access element periodically broadcasts or multicasts discovery requests to its primary central control element and re-associates with it when it receives a discovery response. In one embodiment, assuming a new central control element has been installed, the network administrator configures the central control element identifier to match that of the failed central control element, thereby allowing the access element to identify the new central control element as its primary controller.

The invention has been explained with reference to specific embodiments. Other embodiments will be evident to those of ordinary skill in the art. As discussed above, FIG. 2 illustrates an alternative deployment architecture where direct access lines connect the central control element 24 to the access elements 12, 14. Despite the difference in architecture, however, the initialization and configuration functionality and processes discussed above are essentially the same. In addition, although embodiments of the present invention have been described as operating in 802.11 wireless networks, the present invention can be applied other wireless network environments implementing alternative networking protocols. Furthermore, the present invention has application to other wireless network environments and implementations; for example, the division of functionality between the access elements and the central control elements can be shifted. For example, the access elements can bridge network traffic associated with the remote client elements directly, while transmitting management packets to the central control element. Still further, the light-weight access point protocol can be implemented in connection with substantially autonomous access points managed by a central management server or appliance. It is, therefore, intended that the claims set forth below not be limited to the embodiments described above.

What is claimed is:

1. A method comprising:
 in a wireless local area network including at least one central control element and a plurality of access elements, when a new central control element has been installed for the wireless local area network to replace a failed central control element, configuring the new central control element with a central control element identifier that is the same as a central control element identifier of the failed central control element;
 the new central control element receiving from an access element a discovery request message at the new central control element;
 the new central control element sending a discovery response to the access element, the discovery response including the central control element identifier of the failed central control element;
 the new central control element receiving a join request from the access element, the join request including an access element identifier, a digital certificate and a session identifier; and
 the new central control element authenticating the digital certificate contained in the join request, and if authenticated, generating secret shared cryptographic keys used to encrypt and authenticate messages exchanged between the new central control element and the access element.

2. The method of claim 1, further comprising the new central control element sending a join response to the access element, the join response including the cryptographic keys and a digital certificate of the new central control element.

3. The method of claim 2, wherein the join response further includes a software image version supported and implemented by the new central control element.

4. The method of claim 2, wherein the digital certificate of the new central control element includes a name or other identifier of the new central control element, a serial number of the new central control element, a media access control address associated with the new central control element, a copy of the public key of the new central control element, and a digital signature of a certificate-issuing authority so that access elements can verify that the digital signature of the new central control element is authentic.

5. The method of claim 4, further comprising encrypting the cryptographic keys with the public key of an access element using an asymmetric encryption algorithm, adding a session identifier to the enciphered cryptographic keys, and digitally signing a resulting string with a private key of the new central control element.

6. The method of claim 1, further comprising receiving, via a configuration interface of the new central control element, overriding parameters of the new central control element that cannot be changed and a new access element identifier for one of the plurality of access elements.

7. The method of claim 1, further comprising storing an image of access element software accessible to the plurality of access elements.

8. The method of claim 7, further comprising receiving a configuration request from an access element and generating operational parameters for the access element, taking into account overriding parameters contained in the configuration request, which overriding parameters indicate parameters of the access element that cannot be changed.

9. The method of claim 1, wherein the discovery response further includes a load parameter associated with the new central control element, the load parameter indicating a number of one or more access elements under management and control of the new central control element.

10. The method of claim 1, wherein the new central control element generates the secret shared cryptographic keys using a random number generator.

11. A system comprising:
 at least one central control element and a plurality of access elements in a wireless local area network;
 a new central control element being installed for the wireless local area network to replace a failed central control element, wherein the new central control element is configured with a central control element identifier that is the same as a central control element identifier of the failed central control element;
 wherein the new central control element is configured to:
  receive from a particular access element of the plurality of access elements a discovery request message;
  send a discovery response to the particular access element, the discovery response including the central control element identifier of the failed central control element;
  receive a join request from the particular access element, the join request including an access element identifier, a digital certificate and a session identifier; and
  authenticate the digital certificate contained in the join request, and if authenticated, generate secret shared cryptographic keys used to encrypt and authenticate messages exchanged between the new central control element and the particular access element.

12. The system of claim 11, wherein the new central control element is further configured to send a join response to the particular access element, the join response including the cryptographic keys, and a digital certificate of the new central control element.

13. The system of claim 12, wherein the join response further includes a software image version supported and implemented by the new central control element.

14. The system of claim 12, wherein the digital certificate of the new central control element includes a name or other identifier of the new central control element, a serial number of the new central control element, a media access control address associated with the new central control element, a copy of the public key of the new central control element, and a digital signature of a certificate-issuing authority so that access elements can verify that the digital signature of the new central control element is authentic.

15. The system of claim 14, wherein the new central control element is further configured to encrypt the cryptographic keys with the public key of an access element using an asymmetric encryption algorithm, add a session identifier to the enciphered cryptographic keys, and digitally sign a resulting string with a private key of the new central control element.

16. The system of claim 11, wherein the new central control element is further configured to receive, via a configuration interface, overriding parameters of the new central control element that cannot be changed and a new access element identifier for one of the plurality of access elements.

17. The system of claim 11, wherein the new central control element is configured to store an image of access element software accessible to the plurality of access elements.

18. The system of claim 11, wherein the new central control element is configured to receive a configuration request from an access element and generating operational parameters for the access element, taking into account overriding parameters contained in the configuration request, which overriding parameters indicate parameters of the access element that cannot be changed.

19. The system of claim 11, wherein the discovery response further includes a load parameter associated with the new central control element, the load parameter indicating a number of one or more access elements under management and control of the new central control element.

20. The system of claim 11, wherein the new central control element generates the secret shared cryptographic keys using a random number generator.

* * * * *